US007225178B2

(12) United States Patent
Shimokawa et al.

(10) Patent No.: US 7,225,178 B2
(45) Date of Patent: May 29, 2007

(54) DATA STRUCTURE IN DATABASE, DATABASE SYSTEM FOR MANAGING DATABASE AND DATABASE MANAGING METHOD AND SYSTEM

(75) Inventors: Takayoshi Shimokawa, Yokohama (JP); Kazuo Masai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 454 days.

(21) Appl. No.: 10/084,222

(22) Filed: Feb. 28, 2002

(65) Prior Publication Data

US 2002/0091675 A1 Jul. 11, 2002

Related U.S. Application Data

(63) Continuation of application No. 09/044,163, filed on Mar. 19, 1998, now abandoned.

(30) Foreign Application Priority Data

Mar. 19, 1997 (JP) .................................. 09-065919

(51) Int. Cl.
*G06F 17/30* (2006.01)
(52) U.S. Cl. ........................................................ 707/1
(58) Field of Classification Search .................... 707/1, 707/8, 102, 200, 2, 10; 705/3; 365/185.33; 708/491
See application file for complete search history.

(56) References Cited

U.S. PATENT DOCUMENTS

| 4,646,229 | A |   | 2/1987  | Boyle .......................... 707/203 |
| 4,648,036 | A |   | 3/1987  | Gallant ........................ 707/203 |
| 4,823,310 | A | * | 4/1989  | Grand ............................. 707/8 |
| 4,954,981 | A |   | 9/1990  | Dehner, Jr. et al. .......... 364/900 |
| 4,961,134 | A |   | 10/1990 | Crus et al. ....................... 707/8 |
| 5,261,069 | A |   | 11/1993 | Wilkinson et al. ........... 711/145 |
| 5,280,612 | A |   | 1/1994  | Lorie et al. ...................... 707/8 |
| 5,289,397 | A | * | 2/1994  | Clark et al. .................. 708/491 |
| 5,361,202 | A | * | 11/1994 | Doue ............................. 705/3 |
| 5,504,888 | A | * | 4/1996  | Iwamoto et al. ............ 707/200 |
| 5,623,639 | A |   | 4/1997  | Yazaki et al. ................ 711/167 |
| 5,627,783 | A | * | 5/1997  | Miyauchi ................ 365/185.33 |
| 5,748,952 | A | * | 5/1998  | Chadha et al. .................. 707/2 |

(Continued)

OTHER PUBLICATIONS

C.J. Date, " An Introduction to Database Systems, 3.4 Indexing" Addison-Wesley, 1986, pp. 68-77.

*Primary Examiner*—Etienne P. LeRoux
(74) *Attorney, Agent, or Firm*—Mattingly, Stanger, Malur & Brundidge, P.C.

(57) ABSTRACT

Bookmark information indicative of a time corresponding to a given time series data piece for a predetermined time, state transition information indicative of a state of the time series data piece for the predetermined time, and the time series data piece are loaded in a database. The state transition information has one of a value indicative of an online state, a value indicative of a loading state, and a value indicative of a state in which data in the data area is empty. The time series data pieces for the predetermined times are loaded in a plurality of data areas of the database in sequence of times. In accordance with a data deletion request, state transition information corresponding to a data piece of information corresponding to a data piece of interest is set to a value indicating that the data piece of interest is empty.

2 Claims, 11 Drawing Sheets

U.S. PATENT DOCUMENTS

| | | |
|---|---|---|
| 5,835,915 A | 11/1998 | Carr et al. .................. 707/202 |
| 5,859,662 A | 1/1999 | Cragun et al. ................ 348/13 |
| 5,878,410 A | 3/1999 | Zbikowski et al. ............ 707/2 |
| 5,890,202 A | 3/1999 | Tanaka ....................... 711/111 |
| 5,933,820 A | 8/1999 | Beier et al. .................... 707/1 |
| 6,012,060 A * | 1/2000 | Loaiza et al. ................. 707/10 |

* cited by examiner

ADDITION OF TIME SERIES DATA TO B-TREE

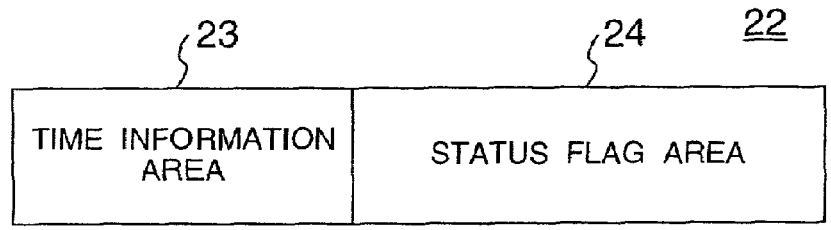
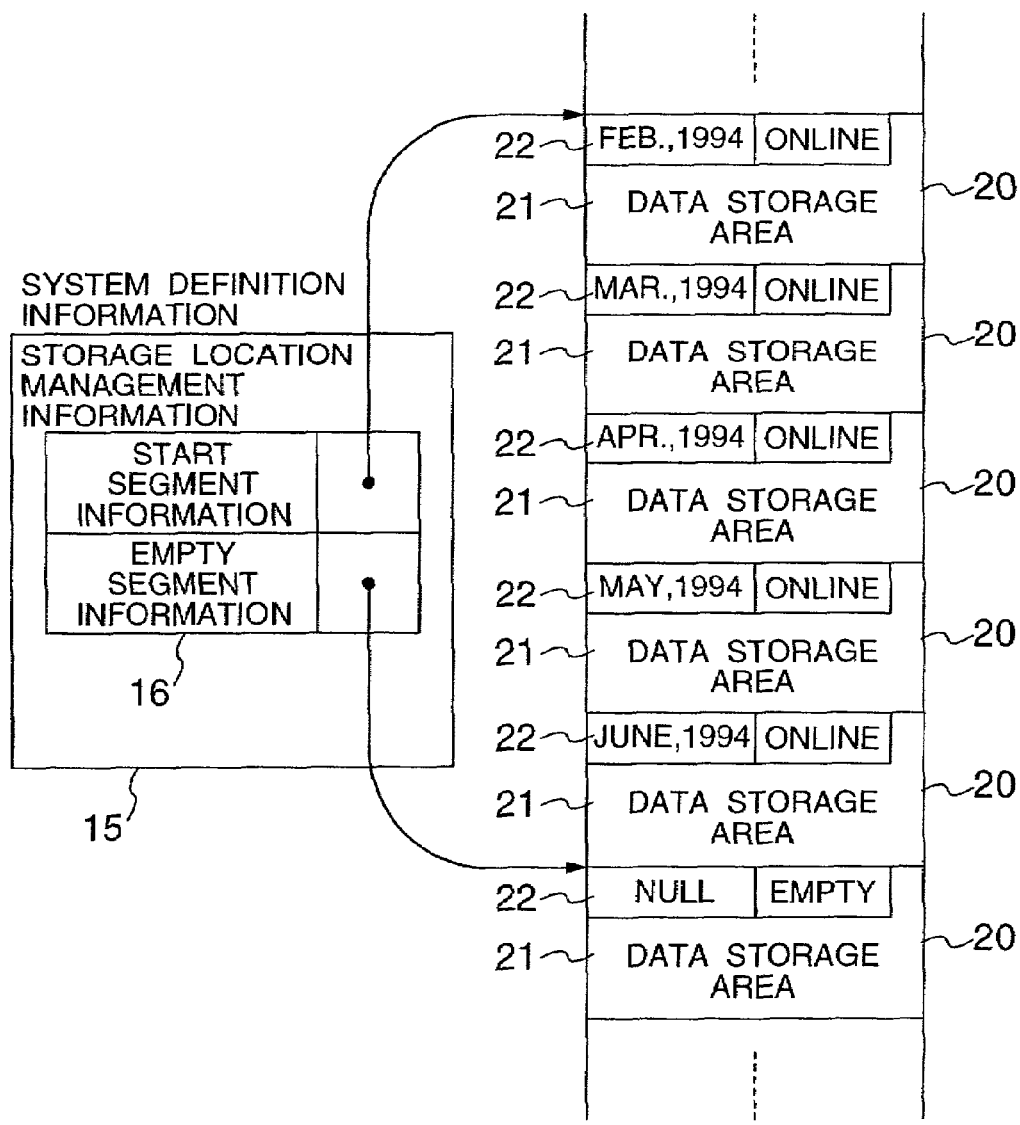

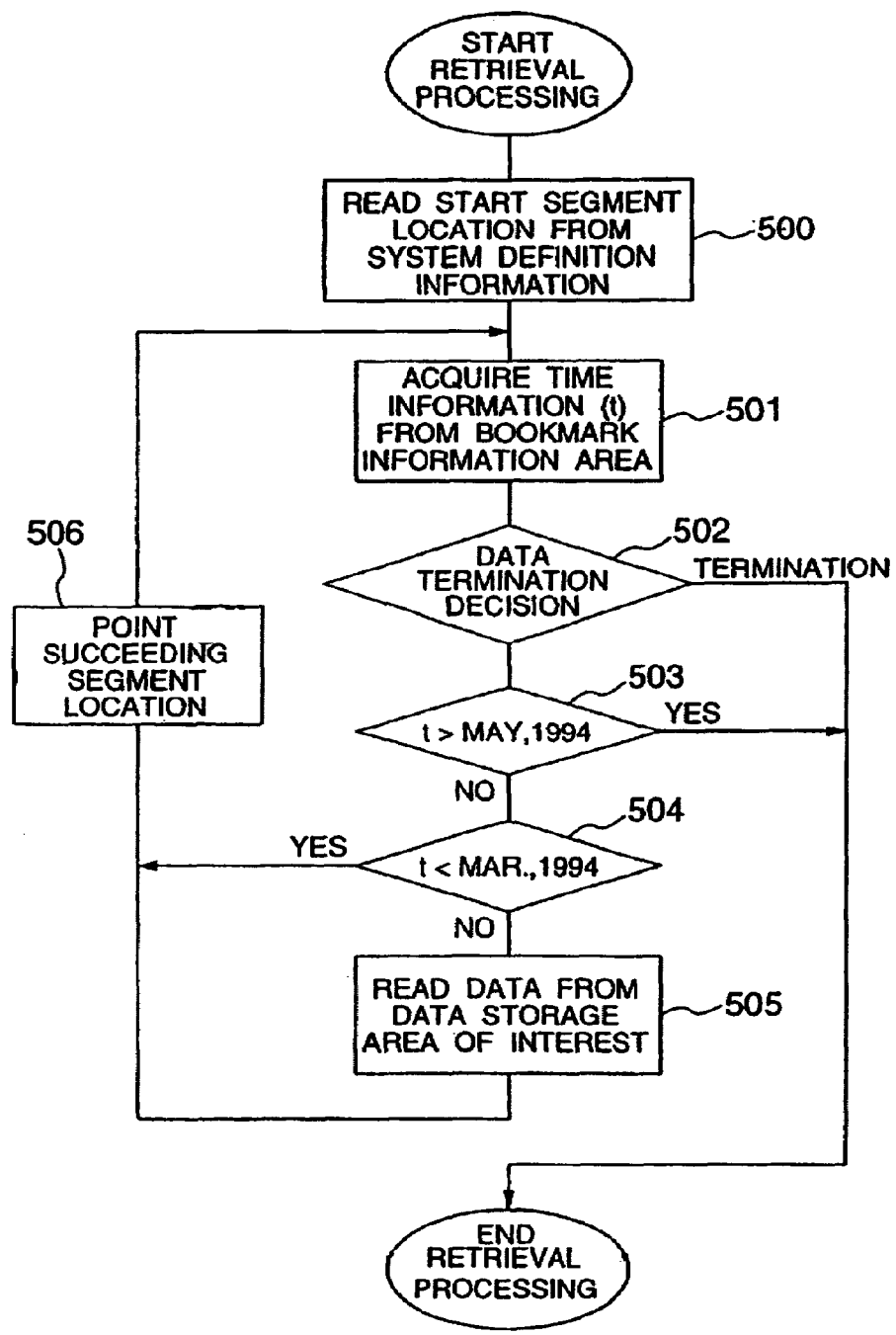

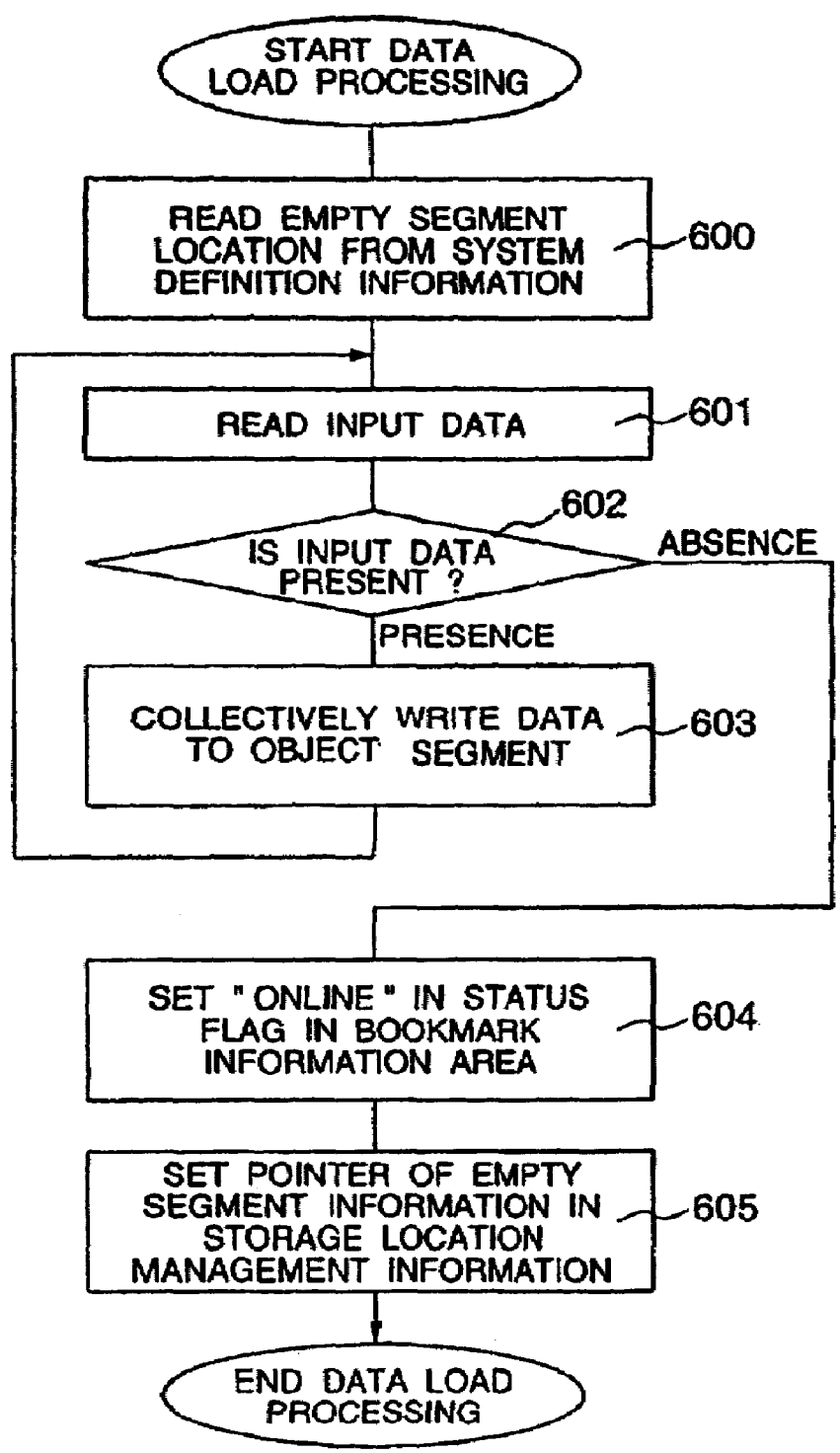

DATA STRUCTURE IN DATABASE, DATABASE SYSTEM FOR MANAGING DATABASE AND DATABASE MANAGING METHOD AND SYSTEM

This is a continuation of parent application Ser. No. 09/044,163, filed Mar. 19, 1998 now abandoned.

BACKGROUND OF THE INVENTION

The present invention relates to a time series database processing system, of an especially ultra-large scale, for storing data pieces serving as updating detailed information in a sequence of time series in a database and for controlling addition/deletion/retrieval of data.

When data pieces are loaded on a database of a large scale and a specified data piece is retrieved from the database, an index is generally applied. Indexing is effective when an item serving as a key during retrieval can be specified. The indexing is a contrivance in which specified key items of a database are collected, a pointer is provided over the key items to take the form of a balanced tree (B tree), and the tree can be traced at a high speed up to a location corresponding to a leaf of the tree in accordance with information indicating which range a key of a specified value lies in. "An Introduction to Database Systems, 3.4 Indexing" by C. J. Date, Addison-Wesley, 1986, pp. 68-77 teaches a contrivance in which information corresponding to storage locations of all data items can be obtained for all the data items. If the database is for about million cases or events, there occurs no problem. But in a database of an ultra-large scale for billion cases or trillion cases, however, the maintenance of index per se swells, and especially, keys which are added in time series fashion may not be handled well.

When data pieces are added in time series fashion, the indexing grows in a direction in which time increases, as shown in FIG. 1. Further, from the standpoint of deletion, it is known that as deletion of indices for which a constant time has expired proceeds, data pieces remain at only one side portion of the indexing tree and values of items are lost in spite of the existence of nodes on the other side portion, thereby placing the indexing in very inefficient condition. In such an event, it is necessary that the indexing be reconstructed by a technique called reorganization to delete wasteful areas in the indexing and promote the efficiency. But in the time series database of ultra-large scale, this is not practical because work far exceeding the permissible range is required.

A utility for data loading uses a technique for writing data directly to a physical area of a database and therefore, with this utility, data can be written at a high speed. However, the utility for high-speed data loading generally inhibits direct data writing to the physical area during data loading from a conflicting area at other retrieval or updating access. In other words, data loading shall compulsorily be executed while inhibiting access to a specified table for retrieval/updating or a part of a table for retrieval/updating. This forces retrieval of the database to be once stopped each time that time series data is loaded, which can be on a daily basis. In a database of ultra-large scale, it takes one day or more for retrieval per se in some applications. In that case, data loading cannot be permitted unless retrieval is stopped, leading to fatal inconvenience. To avoid such situations, data can be added through usual data insertion operation without resorting to data loading, but in this case the performance is degraded by approximately by one order as compared to data loading of a physical writing type. Besides, locking must be acquired for concealing data during addition, largely affecting the performance of operation for retrieval of all cases or events in the database.

In order to delete a data piece in the database for which a constant time has expired, the data piece is typically required to be retrieved, and even in the case of an index, the time consumed in comparison to that for inserting data piece by piece is significant. In the absence of index, all data pieces are retrieved for the purpose of deleting a data piece of interest and consequently, in the database of ultra-large scale, it takes one day or more to operate only the deletion processing and practically, the time series database cannot be materialized.

Thus, for the deletion of data for which a constant time has expired, time exceeding that for retrieval of all pieces of data is consumed in the absence of an index but conversely, in the presence of an index, indexing is updated during deletion, leading to an operation which consumes much time as in the case of data insertion. Accordingly, it is practically difficult to realize daily data deletion for the database which takes one day or more to retrieve all data pieces.

SUMMARY OF THE INVENTION

An object of the invention is to provide a method and system which can eliminate conflict of the operation of time series data loading and data deletion with the operation of data retrieval in a database system and which can mitigate suppression imposed on retrieval by the system.

Another object of the invention is to provide a database managing system which can dispense with reorganization of an index tree which loses balance due to the addition of time series data.

According to the present invention, there is provided a database managing method for managing data pieces in a database, comprising the steps of:

adding, to a given time series data piece for a predetermined time, book mark information having bookmark information indicative of the corresponding time and state transition information indicative of a state of the time series data piece for the predetermined time;

providing, as the state transition information, one of a value indicative of an online state in which a data area is permitted to be retrieved, a value indicative of a loading state in which loading of data in the data area has not yet been completed and the data area is not permitted to be retrieved, and a value indicative of an empty state in which data in the data area is empty; and loading time series data pieces for the predetermined time in a plurality of data areas in the database at a sequence of times corresponding to the time series data pieces.

The method further comprises the steps of:

reading, from the plurality of data areas, a plurality of bookmark information pieces each having state transition information and bookmark information in accordance with a data retrieval request applied to the database by designating a time; and detecting the bookmark information including the designated time, and, when the state transition information included in the detected bookmark information indicates the online state, setting a value indicative of the empty state in the state transition information included in the detected bookmark information.

When the state transition information included in the detected bookmark information indicates either a value indicative of the loading state or a value indicative of the empty state, it can be determined that the data retrieval request has not yet been responded to.

The method further comprises the steps of:

reading, from the plurality of data areas, a plurality of bookmark information pieces each having state transition information and bookmark information in accordance with a data deletion request applied to the database by designating a time; and detecting the bookmark information including the designated time, and, when the state transition information included in the detected bookmark information indicates the online state, setting a value indicative of the empty state in the state transition information included in the detected bookmark information.

The method further comprises the steps of:

cumulating repeatedly applied time series data pieces in a cumulative data storage area until the cumulative data reaches a total data for the predetermined time; and after the repeatedly applied time series data pieces have been collected up to the total data for the predetermined time, adding, to a data piece in the cumulative data storage area, bookmark information having bookmark information indicative of a time corresponding to the data piece for the predetermined time and state transition information indicative of a state of the data piece for the predetermined time and loading resulting data pieces in the plurality of data areas in the database in sequence of times corresponding to the time series data pieces.

According to the present invention, a data structure realized in a database comprises:

a plurality of data areas for loading given time series data pieces at predetermined locations of the database in sequence of times; and a predetermined bookmark information area having bookmark information indicative of a time corresponding to a time series data piece loaded in each of the data areas and state transition information indicative of a state of the data piece in each data area, wherein the state transition information has one of a value indicative of an online state in which the data area is permitted to be retrieved and a value indicative of a loading state in which loading of data in the data area has not yet been completed and the data area is not permitted to be retrieved. The data pieces are arranged consecutively in the database while having a predetermined data capacity so that the plurality of bookmark information areas in the plurality of data areas may be read consecutively.

In the present invention, the database is divided into segments which are each minimum blocks for storage area management and time series data pieces which are stored in the segments. When data is loaded on the database, a time at which the data is loaded is stored as a bookmark at a predetermined location in a start segment from which the addition starts with the database. Thanks to the bookmark, when retrieval of time designation or time interval designation is carried out, the retrieval range can be narrowed physically by utilizing the bookmark.

When data loading is effected, the database can be brought into a loading unfinished state by locating the bookmark in other places than the place in which the data is being loaded. Consequently, data can be loaded directly on a physical segment without affecting other retrieval. At the time that the data loading is completed, the bookmark is written in the above other place and the database is recognized by such assigning a bookmark thereto.

In the case of data deletion, when data pieces following a specified bookmark are to be deleted collectively, the areas are effectively emptied changing the bookmark for the unit of segment within a short time without actually accessing the data. By managing the areas of the database in a unit of segment in wrap-around fashion, the always pooled consecutive areas can be used from one side to load data and replenish an area from the other side of the consecutive areas.

The present invention is effective for a computer system having a database and especially for a database system for retrieval in which data pieces reach the database system in sequence of time series and data change other than addition or insertion and deletion of time series data is not carried out.

BRIEF DESCRIPTION OF THE DRAWINGS

FIG. 4 is a diagram for explaining a bookmark information area.

FIG. 5 is a flow chart of an embodiment of the retrieval processing.

FIG. 6 is a diagram showing the state of the storage apparatus to explain the flow chart of FIG. 4.

FIG. 7 is a flow chart showing an embodiment of the data load processing.

DESCRIPTION OF THE PREFERRED EMBODIMENTS

The present invention will now be described by way of example with reference to the accompanying drawings.

Figure 1:
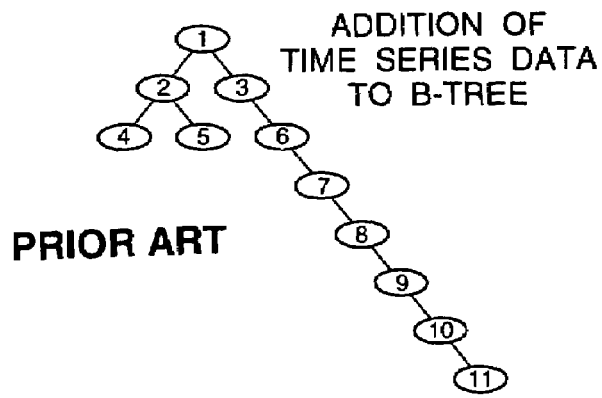
FIG. 1 is a diagram showing indices of a tree which loses balance owing to addition/deletion of time series data.
Figure 2:
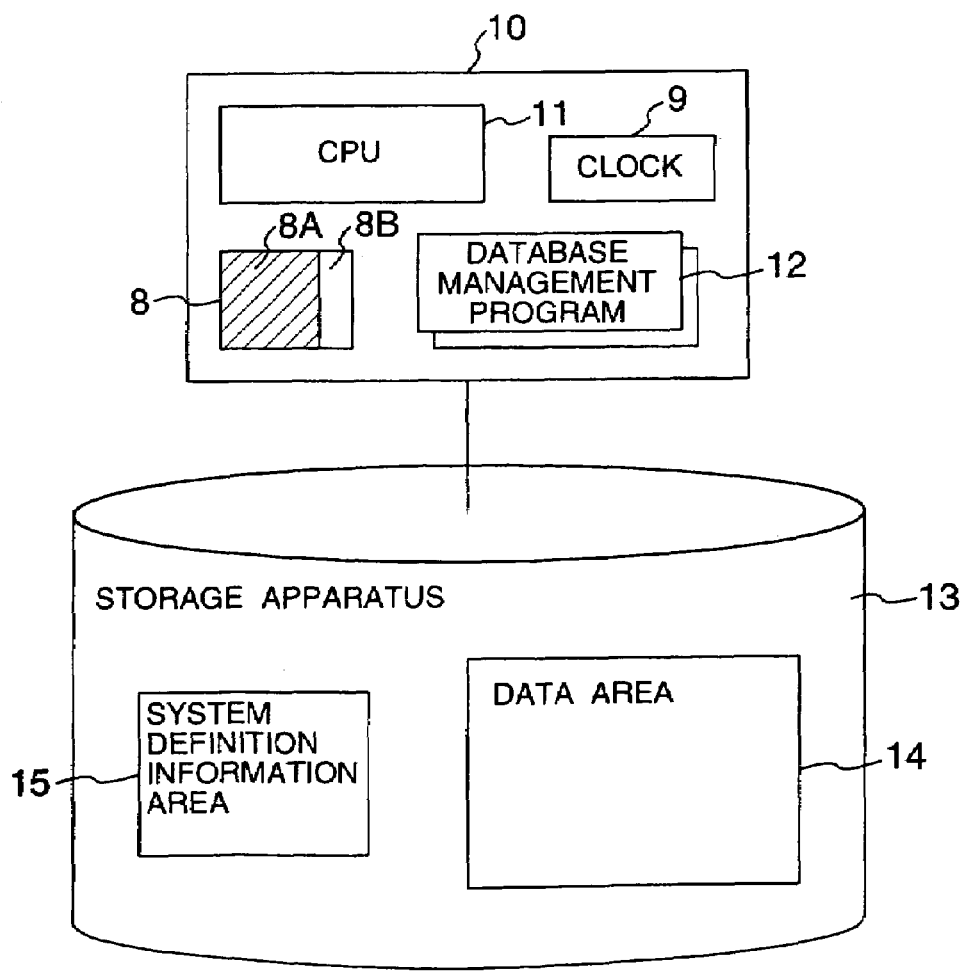
FIG. 2 is a diagram showing an embodiment of system construction according to the present invention.

Referring to FIG. 2, there is illustrated an embodiment of system construction according to the present invention.

As shown in FIG. 2, a database system principally comprises a database system apparatus 10 having a central processing unit (CPU) 11 and a storage apparatus 13 for physically storing data. A database management program 12 operates on the system apparatus 10 to store actual data from a cumulative data area 8 onto the storage apparatus 13. Provided in the storage apparatus 13 are a data area 14 and a system definition information area 15 for storing definition information of data. The area 8 may have a data entity area 8A and an empty area 8B in order to store time series data pieces for a predetermined time and transfer the stored data to the storage apparatus 13.

Figure 3:
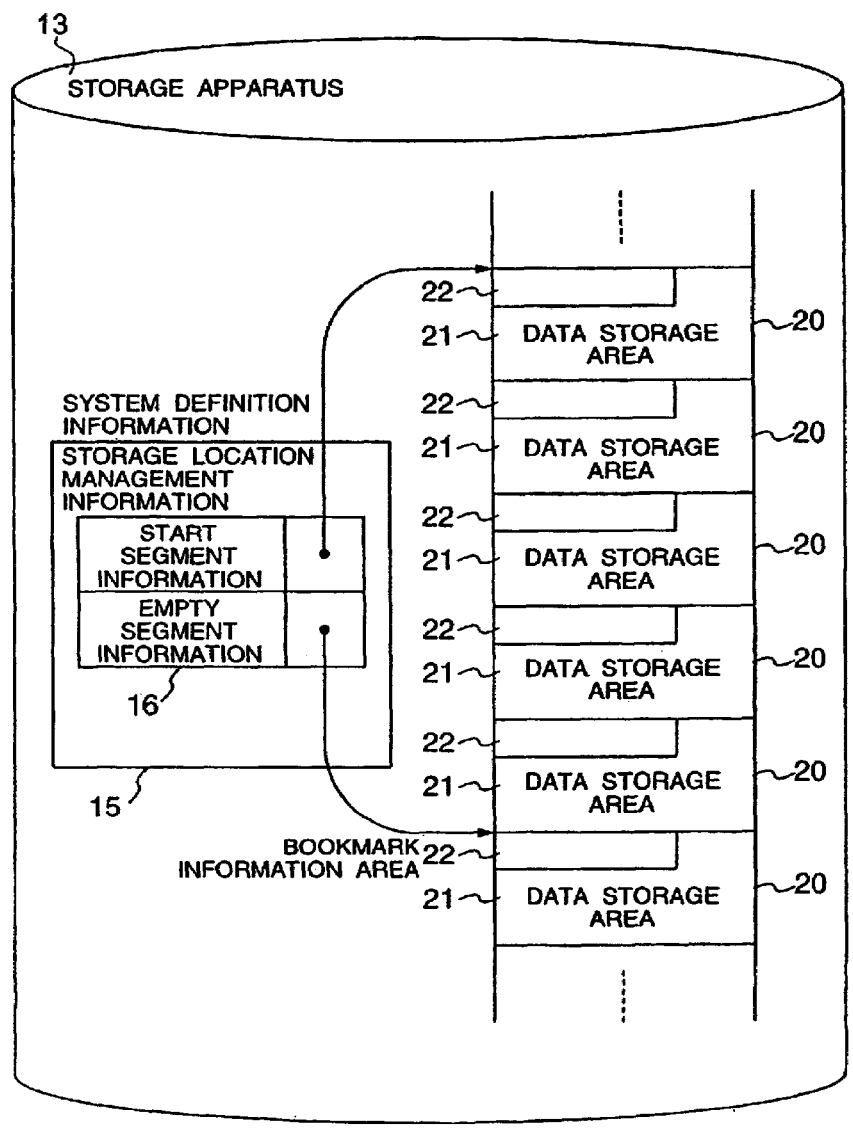
FIG. 3 is a diagram showing the construction of an embodiment of a storage apparatus of the present invention.

Referring to FIG. 3, the construction of the 20 storage apparatus 13 is shown in greater detail to give a detailed explanation of the system definition information area 15 and data area 14. In the present embodiment, the data area 14 has consecutive areas secured on the storage apparatus 13 so as to be divided into management blocks called segments 20. Data pieces generated in time series fashion are put together in the area 8 by means of the management program 12 until they reach an amount for a constant time. The collected data pieces are stored in one of the management block segments of the consecutive areas of the database in the form of the storage apparatus 13, along with a time for storage which is read out of a clock 9 and stored in the same segment or otherwise at a different location. The segment 20 includes, for example, a data storage area 21 for storing real data and a bookmark information area 22 for storing management information for the data stored in the data storage area 21. In the present embodiment, the segment 20 consists of a plurality of pages, each being a unit of disk input/output.

The system definition information 15 has information for managing the storage location of time series data, including information for pointing to a segment 20 which is the oldest in time series and information for pointing to the start of an empty segment area.

As shown in FIG. 4 useful to explain the bookmark information area 22, the bookmark information area includes a time information area 23 for storing information concerning a time which is specific to data stored in the segment 20 and which is delivered out of the clock 9 and a status flag area 24 for storing status flag information indicative of a shifting or transition state (to be described below) of the segment 20. The shifting or transition state is classified into three states or modes including "online" indicating that the data storage area is accessible, "loading" indicating that data is now being inserted and "empty" indicating that no data is present in the data storage area. The status of the segment 20 shifts from one mode or state to another.

Next, the operation of the present embodiment will be described.

In the time series database, retrieval for which time is specified is frequently practiced. For example, the title and the date of issue of a book published by a publisher are stored in time series fashion in a time series database of the publisher by using the issue date as a key, and an example will be described hereunder in which the database is retrieved for a list of titles of books issued over three months which range from March, 1994 to May, 1994.

The retrieval processing of the present embodiment will be described with reference to FIGS. 5 and 6. FIG. 5 is a flow chart showing an embodiment of the retrieval processing in the present embodiment and FIG. 6 is a diagram showing the state of the storage apparatus useful to explain the flow chart of FIG. 5.

In the database system of the present embodiment, information for pointing to a segment 20 which stores the oldest data in time series is first acquired from the system definition information 15 (step 500). Then, the database system acquires time information t (February, 1994) and status information (online) from a bookmark information area 22 of the pointed segment 20 (step 501). Acquisition of the system definition information is carried out at a high speed because a predetermined capacity of data can be acquired starting with the start of a plurality of segments arrayed at equi-capacity intervals on the database.

If the acquired status information is "empty" or "loading", the data to be retrieved has not been stored in the segment 20 or data is now being inserted in the segment 20 and hence it is determined that access is impossible and the retrieval processing ends (step 502).

If the status information is "online", access is permitted and the program proceeds to the next process (step 503). The posterior retrieval request time (May, 1994) is compared with the time information (February, 1994) stored in the bookmark information area 22 to decide whether the intended data is stored in the database. If the result of comparison is "Yes", in a test to determine whether the stored newer data is newer than the range of the retrieval object (March, 1994 to May, 1994), the retrieval processing ends. When "No" is issued in the decision process, the program proceeds to the next process (step 504) to decide whether the segment 20 now pointed to is within the retrieval request time (March, 1994 to May, 1994). Since the segment 20 is of February, 1994, this data storage area 21 is excluded from the retrieval object and a segment 20 for storing data which succeeds in terms of time series is pointed to (step 506). For example, it is assumed that a magnetic disk device is used as the storage apparatus 13 and given that all of the segments 20 have the same size, the succeeding segment can be pointed to by moving the size of segment (a moving amount relative to the magnetic head) starting from the header of the present disk.

Next, for that succeeding segment 20, the decision process similar to the above (steps 502, 503 and 504) is executed. When it is determined in the process (step 504) that the segment 20 is one which meets the retrieval request, data is read out of the corresponding data storage area 21 in the segment 20 (step 505). Since the header of the disk points to the start of a segment 20 which stores the next data in terms of time series after the data has been read out of the data storage area 21 (step 506), time information is again acquired from a bookmark information area 22 and thereafter, the decision is repeated in a similar way. In this manner, the segments 20 are sequentially read. Since in the decision process (step 503) of a segment 20 the segment is determined to be outside the retrieval object, the retrieval processing ends at that time.

Next, the data load processing will be described with reference to FIG. 7. FIG. 7 is a flow chart showing the data load processing in the present embodiment. In the present embodiment, an instance will be described in which data pieces of from July, 1994 to August, 1994 are loaded from the system apparatus to the database, that is, data loading is carried out. It is now assumed that data pieces to be inputted in the form of files have already been sorted in terms of time series. The following description will be given by referring to an example where data is added to the initial state illustrated in FIG. 6.

Figure 8:
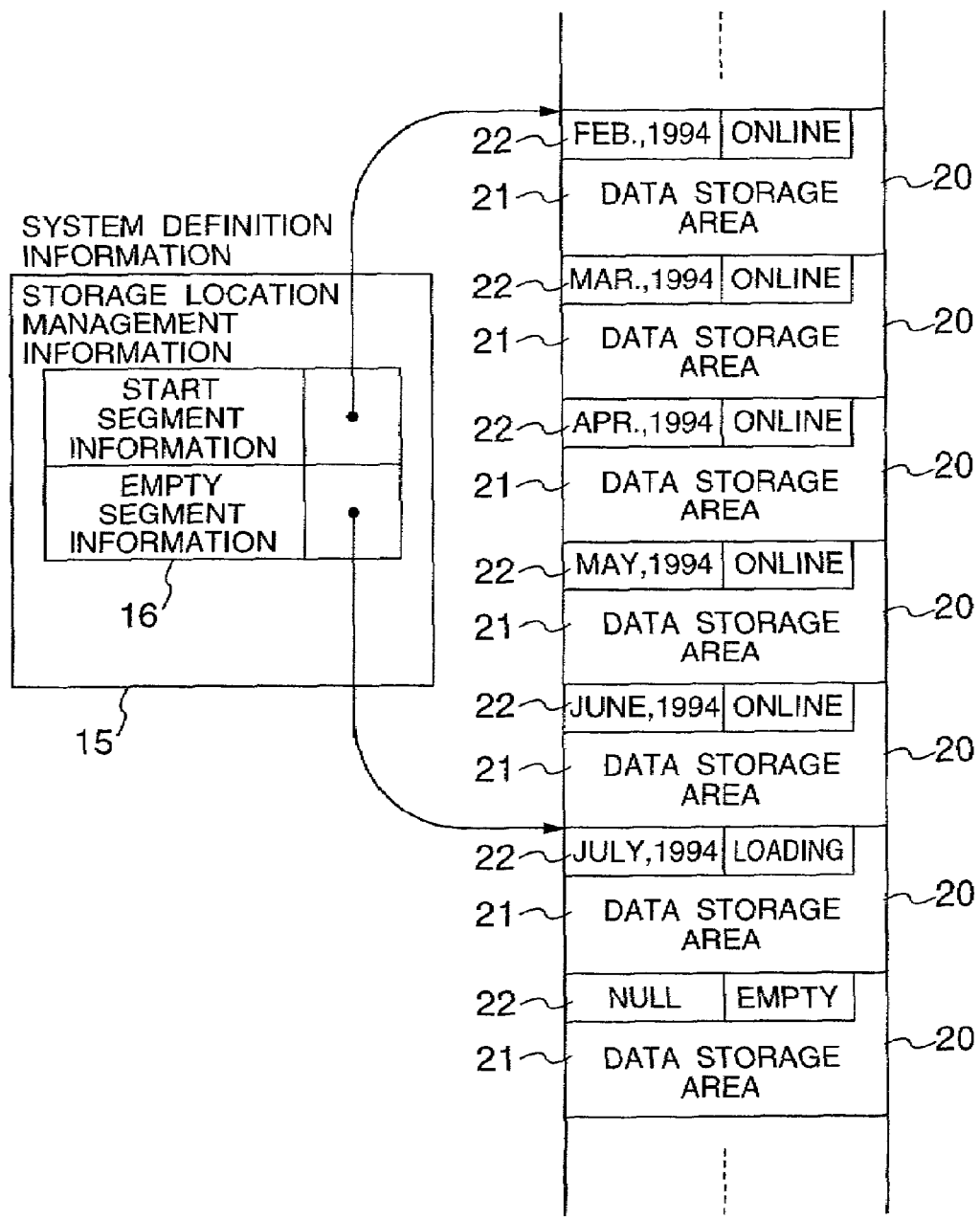
FIG. 8 is a diagram showing the state of the storage apparatus in mid course to explain the flow chart of FIG. 6.

Firstly, empty segment information is read out of 5 the system definition information 15 (step 600). An empty segment 20 is pointed to by that information. In order to read input data, the input file is accessed and data (July, 1994) is read (step 602). Because of the presence of the data, "presence" is determined in the process (step 602) and the program proceeds to the process (step 603). In the process (step 603), a write process is executed. Firstly, the time, information (July, 1994) is written at the time information area and a flag "loading" indicating, currently loading at the status flag area in the bookmark information area 22, and data is written into the data storage area 21. After completion of the data writing, a state as shown in FIG. 8 prevails.

After the writing of data for one segment has been terminated, the database system reads the next input data from the file (step 601). Because of the presence of data for August, 1994, "presence" is determined in the decision process (step 602). Through the same logic as that used for writing the data for July, 1994, time information (August, 1994), a status flag "loading" and data are written at the time information area 23, status flag area 24 and data storage area 21 in a segment 20 (step 603).

After completion of the data writing, the system is about to read the next data from the file (step 601). But, since data has already been absent in the file, "absence" is determined in the decision process (step 602) and the program proceeds to the next process (step 604 in FIG. 7).

After write of the input data to the database has been finished, the database system starts updating the status flag in the bookmark information area in order to make the segments written with the new data accessible (step 604).

When write of the final data is completed, the database system reads the empty segment information 16 in the system definition information 15 and points a segment 20 which has initially been written with the new data. Since in that segment 20 the status flag in the bookmark area 22 is set with "loading", this flag is shifted to "online". This permits that segment to be retrieved. In the present embodiment, the size of segment is defined as in the case of retrieval and therefore, a segment 20 stored with the next information in time series fashion can be pointed.

Figure 9:
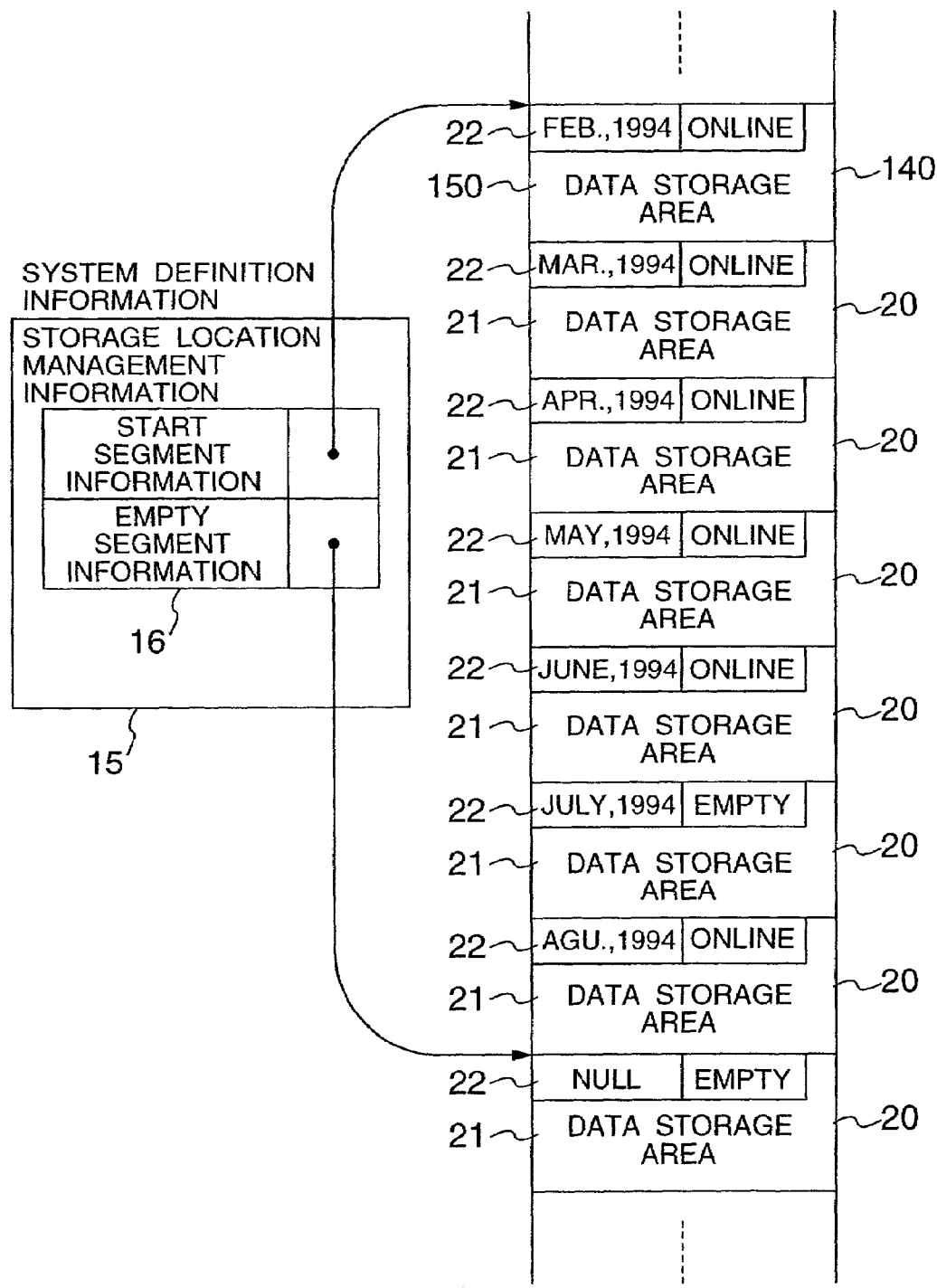
FIG. 9 is a diagram showing the final state of the storage apparatus to explain the flow chart of FIG. 6.

The shift or transition processing from "loading" to "online" ends when the status flag of the read bookmark information area indicates "empty" and address information for that segment is set in the empty segment information 16 in the system definition information 15 (step 605). A state in which the data load processing is thoroughly completed is shown in FIG. 9. As will be seen from the above, even during loading, the database system need not suppress the data retrieval request because by adopting the flag, it is possible to realize such a setting operation that access to the disk having a segment in which the "loading" flag is not raised can be permitted and access to the disk having a segment in which the flag is raised cannot be permitted.

Figure 10:
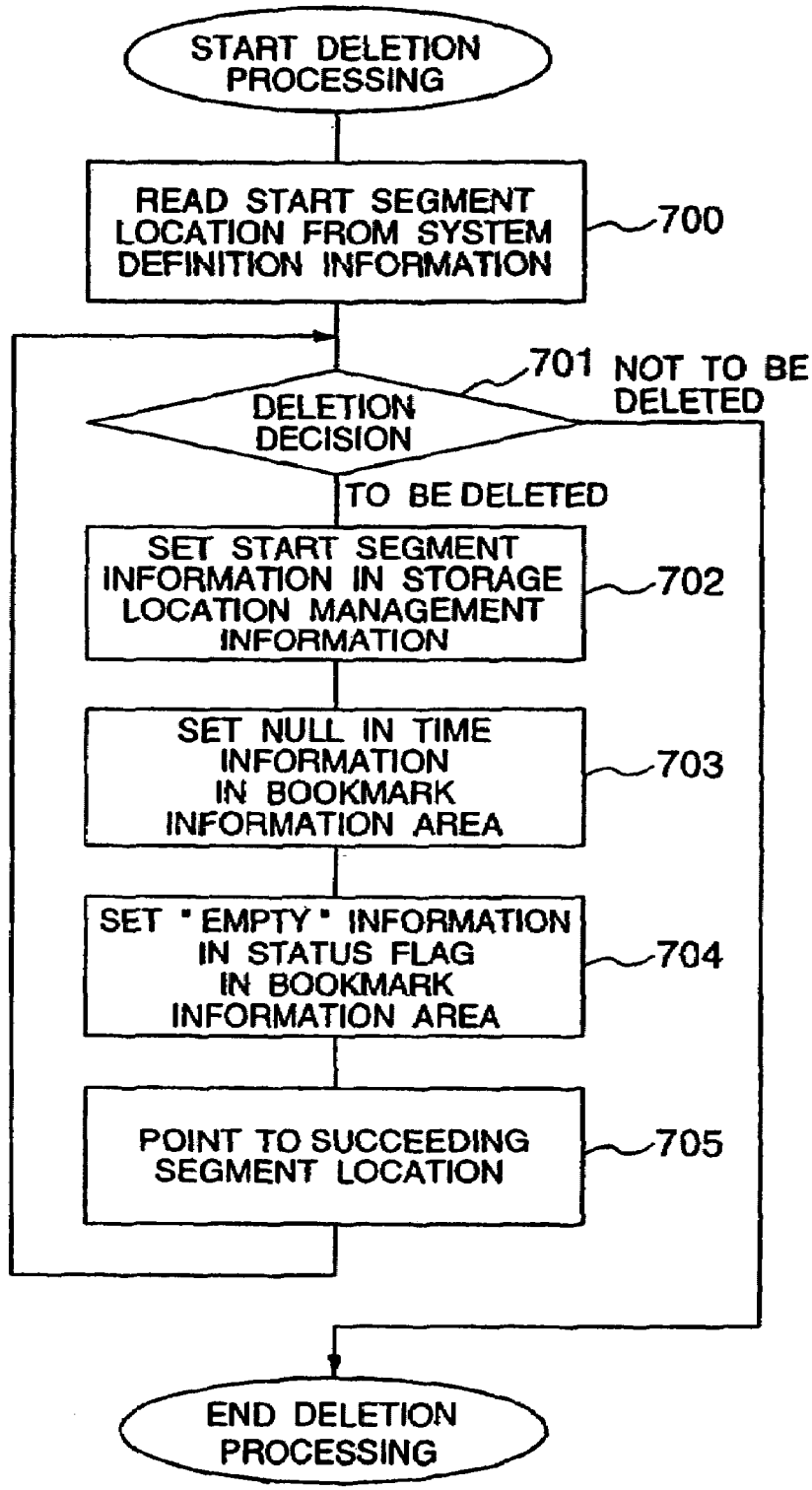
FIG. 10 is a flow chart of an embodiment of the deletion processing.

Next, the deletion processing will be described with reference to FIG. 10. FIG. 10 is a flow chart showing an embodiment of the deletion processing.

In the present embodiment, the state shown in FIG. 6 is considered as the initial state and the segment 20 for February, 1994 is deleted.

Firstly, start segment information 16 is read out of the system definition information 15 (step 700). Time information (February, 1994) is acquired from the bookmark information area 22 of the segment 20 and it is decided whether the segment 20 is one which is an object to be deleted (step 701).

Since the deletion object is of February, 1994, that segment 20 is determined to be the deletion object. The start segment information 16 in the system definition information 15 is shifted to the next segment 20 (for March, 1994) in time series fashion. The segment size is determined and therefore, a start segment address can be obtained by adding by the segment size (step 702).

Subsequently, time information (null) is set to the bookmark information area 22 (step 703) and "empty" is set to the status flag (step 704). By initializing the bookmark information area 22 (steps 703 and 704), the segment 20 can be shifted to an inaccessible state.

Figure 11:
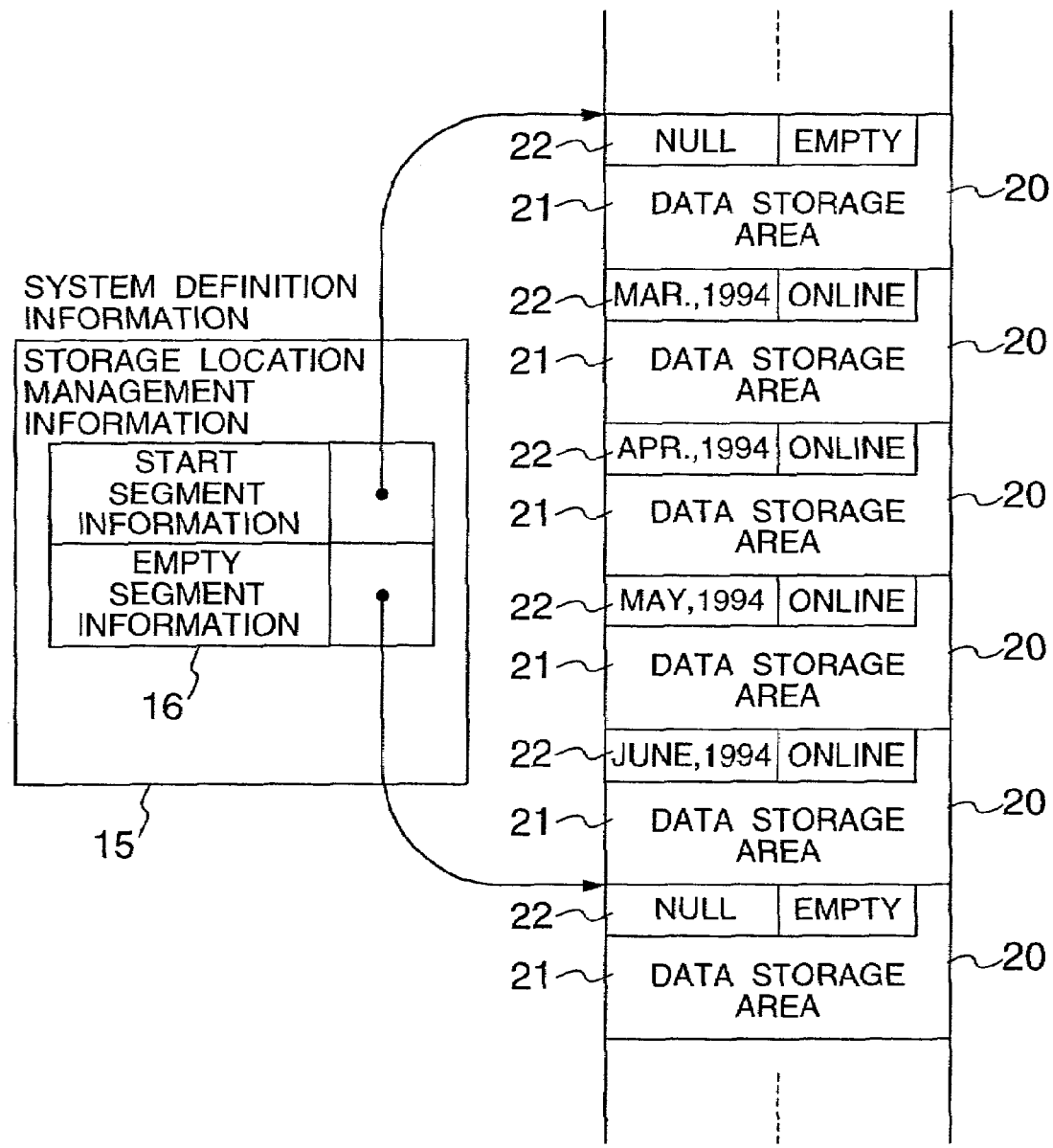
FIG. 11 is a diagram showing the state of the storage apparatus in mid course to explain the flow chart of FIG. 9.

A segment 20 which is next in terms of time series is pointed to (step 705) and time information (Mar. 5 1994) is acquired from the bookmark information area 22 of that segment 20. The acquired time information (March, 1994) is compared with February, 1994 for the deletion object and it is determined that the segment 20 is not the deletion object (step 701), thus ending the deletion processing. After the completion, the database assumes a state as shown in FIG. 11.

In the present deletion processing, internal data need not be directly accessed and only the bookmark information area is taken as the object, thereby making it possible to perform deletion within a short time and while online.

The segments are used in wrap-around fashion to attain an advantage in that no reorganization is needed even when addition/deletion is repeated. Finally, the wrap-around architecture will be described.

Figure 12:
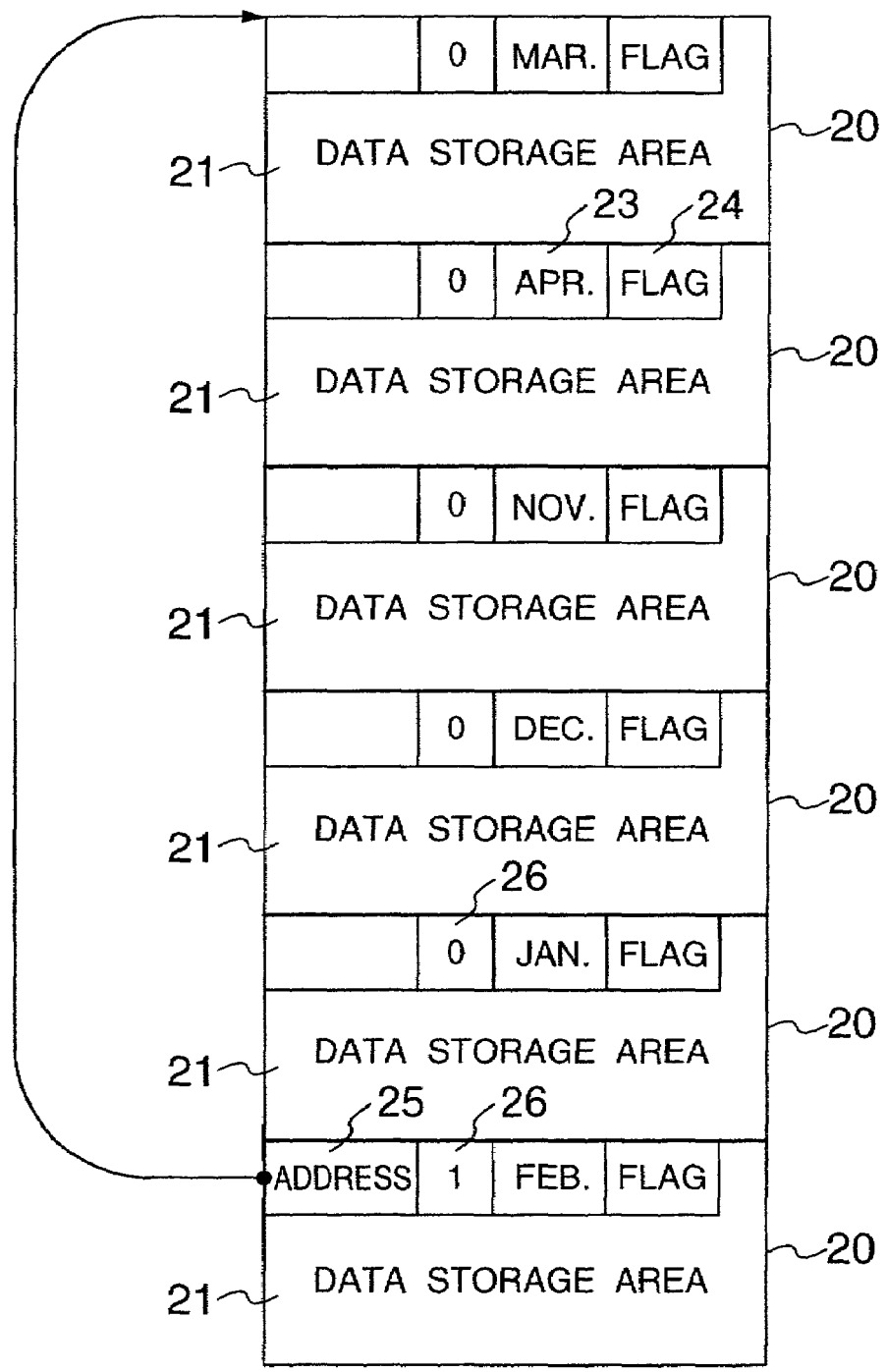
FIG. 12 is a diagram showing the construction of the storage apparatus to explain an embodiment of a wrap-around architecture.

Referring now to FIG. 12, there is illustrated an embodiment of the wrap-around architecture. A method of wrap-around which uses the respective segments temporally cyclically can be realized by setting a "start" flag 26 and a start address area 25 in the bookmark information area 22 of each segment 20. In a segment which is at the physically lowest position, "1" is set in the "start" flag 26 and an address of a start one 20 of the segments is set in the start address area 25. Even in the processing of retrieval/deletion/insertion, this setting can be realized easily by adding a process of jumping to the start address on the extension of the retrieval/deletion/insertion processing because the processing of referring to the bookmark information area is always employed in the retrieval/deletion/insertion processing. In this example, a database is shown which always holds data of the latest six months in a minimal segment capacity.

Figure 13:
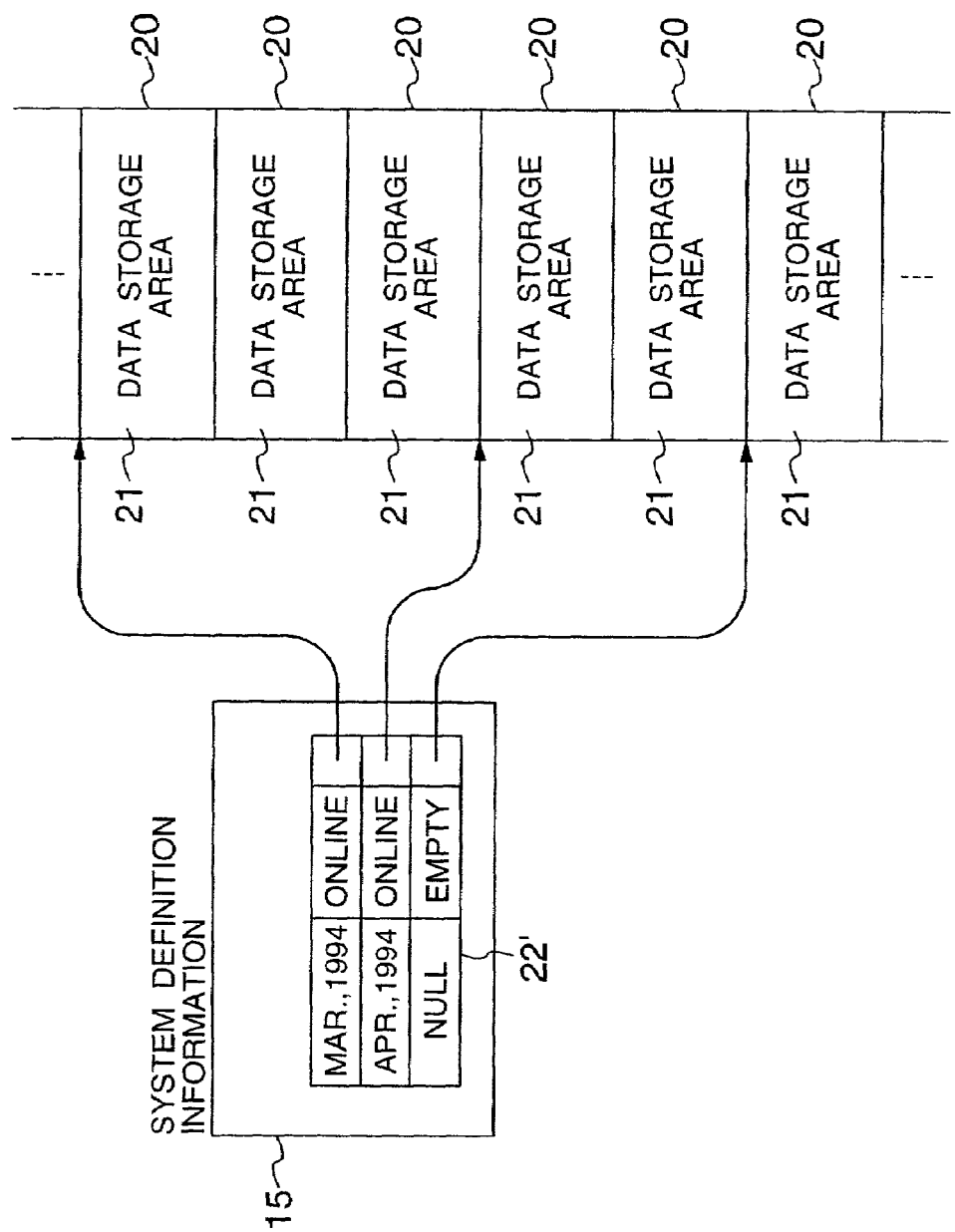
FIG. 13 is a diagram showing the construction of another embodiment of the storage apparatus of the present invention.

Data pieces over a certain constant time are frequently managed by a plurality of segments 20. FIG. 13 shows an embodiment of the present invention which meets this case. In the present embodiment, a system is available in which bookmark information pieces are stored in a bookmark information area 22' in the system definition information 15 so as to undergo centralized control. This system is more practical because it has such a merit that the area to be written with data is not limited by the bookmark information area and the respective segments need not have capacities which are matched to the same value.

As described above, according to the embodiments of the present invention, the intended data can be accessed without resorting to an index by retrieving thoroughly only the specified control information storage range without retrieving the whole of the database.

In an embodiment of the present invention, data loading can be accomplished at a very high speed without stopping retrieval by temporarily making addition of data to a different empty segment in advance and at the time of completion of the data loading, assigning the data with a bookmark in the form of a table of the database.

In an embodiment of the present invention, in connection with deletion of data for which a constant time is exceeded, a segment to be deleted can be specified by retrieving the bookmark and the segment is a unit of area management of the database so that the area may be emptied, with the result that deletion can be accomplished within a very short time (typically, approximately several seconds to several minutes).

According to the present invention, the scale of the bookmark information can be small as compared to the data amount which is very large, thus ensuring that the maintenance processing can be realized very easily and the bookmark information can be retrieved within a very short time even in a large-scale database.

According to the present invention, in a large-scale database which has a very large amount of data and in which storage and deletion of data pieces which arrive in sequence of time series, high-speed retrieval can be carried out and even during online, the data load and deletion processing can be realized.

The invention claimed is:

1. A database management method for managing data in a database for magnetic heads, comprising the steps of:

inputting and dividing data, which arrive in sequence of time series, into segments of a predetermined size, and storing said segments together with bookmark information in a data area of a storage of said database, each of said bookmark information of a segment including time information and status information, wherein said time information is read out of a clock included in said database and wherein status information of loading is written into a currently storing segment during the storing thereby to make the currently storing segment inaccessible, thereafter status information indicating an online state is written thereby to make a stored segment accessible;

storing a segment having time information of null and status information of empty into a position next to a last segment of said segments stored in said data area;

setting, in a system definition information area of said storage, storage location management information having start segment information that points to a start segment of said segments and empty segment information that points to said segment having said time information of null and said status information of empty stored in said data area;

reading, in response to receiving further data which arrive in sequence of time series following said data divided, empty segment information out of said system definition information area thereby to point to a segment and divide said further data into segments and store the segments into said data area starting from said segment pointed to, wherein status information of loading is written into a currently storing segment during the storing thereby to make the currently storing segment inaccessible, thereafter status information indicating an online status is written thereby to make a stored segment accessible;

storing a segment of said further data having time information of null and status information of empty into a position next to a last segment of said segments of said further data stored in said data area;

setting, in a system definition information area of said storage, empty segment information that points to said segment of said further data having said time information of null and said status information of empty stored in said data area; and acquiring, when a deletion operation of one or a plurality of segments having certain time information, time information out of said bookmark information of the segments having status information indicating an online status stored in said data area of said storage to decide whether said one or a plurality of segments are ones which are to be deleted, and if this decision is yes, shifting start segment information in said system definition information area, if any, to a next segment in time series fashion and setting time information of null and status information of empty into the bookmark information area of said one or a plurality of segments.

2. A database management method according to claim 1, further comprising the steps of:

setting, in said inputting step, a start flag area and a start address area in each bookmark information area of predetermined segments of said segments;

setting a predetermined value and address in said start flag area and said start address area of a segment which is at physically lowest position of said predetermined segments, respectively; and adding, in each of said inputting step, reading step, and acquiring step, a process of jumping to a segment pointed to by said start address.

\* \* \* \* \*